(12) United States Patent
Jayasena

(10) Patent No.: US 12,204,900 B2
(45) Date of Patent: Jan. 21, 2025

(54) PREDICATES FOR PROCESSING-IN-MEMORY

(71) Applicant: Advanced Micro Devices, Inc., Santa Clara, CA (US)

(72) Inventor: Nuwan S Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/953,142

(22) Filed: Sep. 26, 2022

(65) Prior Publication Data

US 2024/0103860 A1    Mar. 28, 2024

(51) Int. Cl.
   *G06F 9/30* (2018.01)
   *G06F 15/78* (2006.01)

(52) U.S. Cl.
   CPC ........ *G06F 9/3004* (2013.01); *G06F 9/30029* (2013.01); *G06F 9/30072* (2013.01); *G06F 15/7821* (2013.01)

(58) Field of Classification Search
   CPC .............. G06F 9/3004; G06F 9/30029; G06F 9/30072; G06F 15/7821
   See application file for complete search history.

(56) References Cited

U.S. PATENT DOCUMENTS

| | | | | |
|---|---|---|---|---|
| 6,970,988 B1 * | 11/2005 | Chung | ................ | G06F 15/7821 711/104 |
| 9,535,876 B2 * | 1/2017 | Walker | ................ | G06F 9/30072 |
| 2002/0199090 A1 * | 12/2002 | Wilson | ................ | G06F 9/30072 712/E9.05 |
| 2012/0084539 A1 | 4/2012 | Nyland et al. | | |
| 2013/0159674 A1 | 6/2013 | Muff et al. | | |
| 2015/0277910 A1 | 10/2015 | Grochowski et al. | | |
| 2017/0075689 A1 | 3/2017 | Branscome | | |
| 2022/0253247 A1 | 8/2022 | Kim et al. | | |

FOREIGN PATENT DOCUMENTS

WO    2024073182 A1    4/2024

OTHER PUBLICATIONS

Shen et al.; Modern Processor Design: Fundamentals of Superscalar Processors, Beta Edition; 2002; McGraw-Hill Companies (Year: 2002).*
Tome et al.; HIPE: HMC Instruction Predication Extension Applied on Database Processing; 2018; EDAA (Year: 2018).*
PCT/US2023/071767, "International Seach Report and Written Opinion", PCT Application No. PCT/US2023/071767.

* cited by examiner

*Primary Examiner* — Corey S Faherty
(74) *Attorney, Agent, or Firm* — FIG. 1 Patents

(57) ABSTRACT

Predicates for processing in memory is described. In accordance with the described techniques, a predicate instruction to compute a conditional value based on data stored in a memory is provided to a processing-in-memory component. A response that includes the conditional value computed by the processing-in-memory component is received, and the conditional value is stored in a predicate register. One or more conditional instructions are provided to the processing-in-memory component based on the conditional value stored in the predicate register.

20 Claims, 4 Drawing Sheets

PREDICATES FOR PROCESSING-IN-MEMORY

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than processing-in-memory components. As a result, these conventional computer architectures suffer from increased data transfer latency, which can decrease overall computer performance. Further, due to the proximity to memory, PIM architectures can also provision higher memory bandwidth and reduced memory access energy relative to conventional computer architectures particularly when the volume of data transferred between the memory and the remote processing unit is large. Thus, processing-in-memory architectures enable increased computer performance while reducing data transfer latency as compared to conventional computer architectures that implement remote processing hardware.

DETAILED DESCRIPTION

Overview

Figure 1:
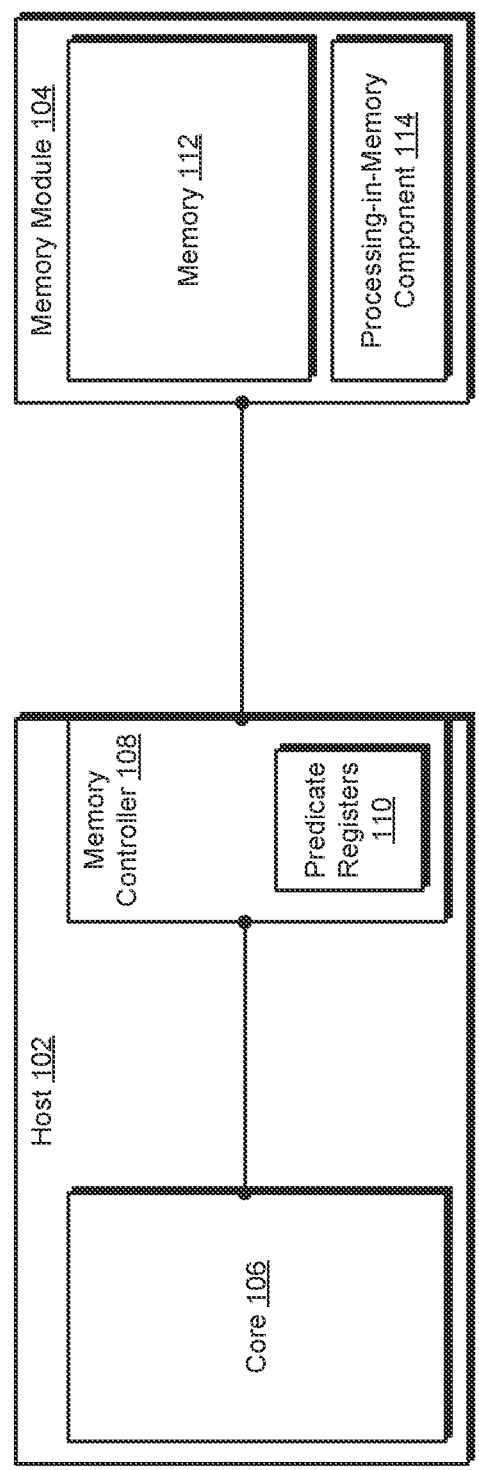
FIG. 1 is a block diagram of a non-limiting example system having a host with a core, a memory module with a processing-in-memory component, and predicate registers between the core and the memory module.

Processing-in-memory architectures help alleviate memory performance and energy bottlenecks by moving some memory-intensive computations to memory. In some processing-in-memory architectures, a core is configured to issue instructions to the processing-in-memory component. However, when execution flow depends on data in the memory (e.g., data-dependent if-then-else control flows), this becomes inefficient as the instructions issued by the core are conditional on values of data in memory.

One conventional approach for issuing conditional instructions based on data in memory is for the data in the memory to be communicated to the core so that the core can determine which conditional instructions to issue next, e.g., by computing a predicate with the data returned to the core from the memory. In this conventional approach, however, the core must issue a read for the data from memory, receive a data response, and then conditionally issue the appropriate instructions for execution by the processing-in-memory component. Notably, these back-and-forth data communications between the core and the processing-in-memory component can cause long delays and reduced performance.

In another conventional approach, instead of the core waiting to receive the memory data, the core speculatively issues the conditional instructions to the processing-in-memory component, e.g., both the "then" path instructions and the "else" path instructions. The processing-in-memory component then determines which of the conditional instructions (e.g., the "then" or "else" path instructions) to execute based on the data in memory. This approach reduces the number of back-and-forth communications between the core and the processing-in-memory component, but requires extra bandwidth to communicate the extra conditional instructions to the processing-in-memory component.

To overcome these problems, predicates for processing-in-memory is described. In accordance with the described techniques, a memory controller receives instructions issued by a core, and provides one or more predicate instructions to a processing-in-memory component. The predicate instructions instruct the processing-in-memory component to compute a predicate. As described herein, a "predicate" refers to a condition expression (e.g., value at Memory Location A is greater than defined threshold). The processing-in-memory component generates a conditional value responsive to computing the predicate. Examples of conditional values include, but are not limited to, Boolean values, such as true and false.

The conditional value is returned to the memory controller, which stores the conditional value in predicate registers. Notably, the predicate registers are closer to the processing-in-memory component than the core. For example, the predicate registers are located at the memory controller in one or more implementations. Due to this, communication of the conditional value between the processing-in-memory component and the predicate registers is faster and consumes fewer computing resources than communication of such data between the processing-in-memory component and the core.

The memory controller uses the conditional values stored in the predicate registers to filter which conditional instructions are communicated to the processing-in-memory component. As an example, the memory controller issues a conditional instruction (e.g., a "then" path instruction) to the processing-in-memory component if the conditional value stored in the predicate registers is true, and issues a different conditional instruction (e.g., an "else" path instruction) to the processing-in-memory component if the conditional value stored in the predicate registers is false. The memory controller also "squashes" the unnecessary conditional instructions, which prevents them from being communicated to the processing-in-memory component, based on the conditional values stored in the predicate registers.

By filtering conditional instructions at the memory controller using conditional values stored in the predicate registers, the described techniques prevent conditional instructions that are not executed based on data in the memory from being sent over memory interfaces to the memory module. This avoids wasting memory command bandwidth so that it is usable for other operations and is advantageous in scenarios where processing-in-memory instructions include numerous conditions and numerous respective sets of conditional instructions. The described techniques thus limit the conditional instructions that are issued to the processing-in-memory component to those that are ultimately executed by the processing-in-memory component. The described techniques also move processing of predicates from the core to the processing-in-memory component, which is communicatively (and often physically) closer to the data in the memory on which the predicates are evaluated.

In some aspects, the techniques described herein relate to a method including: providing, to a processing-in-memory component, a predicate instruction to compute a conditional value based on data stored in a memory, receiving, from the processing-in-memory component, a response that includes the conditional value computed by the processing-in-memory component, storing the conditional value in a predicate register, and providing, to the processing-in-memory component, one or more conditional instructions based on the conditional value stored in the predicate register.

In some aspects, the techniques described herein relate to a method, wherein the providing the one or more conditional instructions based on the conditional value stored in the predicate register further includes: providing, to the processing-in-memory component, a first conditional instruction of the one or more conditional instructions if the conditional value corresponds to a first value, or providing, to the processing-in-memory component, a second conditional instruction of the one or more conditional instructions if the conditional instruction corresponds to a second value.

In some aspects, the techniques described herein relate to a method, further including preventing at least one of the one or more conditional instructions from being provided to the processing-in-memory component based on the conditional value stored in the predicate register.

In some aspects, the techniques described herein relate to a method, wherein the providing, receiving, storing, and providing is performed by a memory controller.

In some aspects, the techniques described herein relate to a method, wherein the predicate register is located at the memory controller.

In some aspects, the techniques described herein relate to a method, wherein the memory controller receives the predicate instruction and the one or more conditional instructions from a core.

In some aspects, the techniques described herein relate to a method, wherein the core issues the one or more conditional instructions without waiting for the processing-in-memory component to process the predicate instruction.

In some aspects, the techniques described herein relate to a method, wherein the predicate register is located between the core and the processing-in-memory component.

In some aspects, the techniques described herein relate to a method, wherein the response that includes the conditional value is received from the processing-in-memory component via a dedicated return connection.

In some aspects, the techniques described herein relate to a method, wherein the conditional value includes a Boolean value.

In some aspects, the techniques described herein relate to a system including: a predicate register for storing conditional values computed by a processing-in-memory component, and a memory controller configured to: provide, to the processing-in-memory component, a predicate instruction to compute a conditional value based on data stored in a memory, receive, from the processing-in-memory component, a response that includes the conditional value computed by the processing-in-memory component, store the conditional value in the predicate register, and provide, to the processing-in-memory component, one or more conditional instructions based on the conditional value stored in the predicate register.

In some aspects, the techniques described herein relate to a system, wherein the predicate register is located at the memory controller.

In some aspects, the techniques described herein relate to a system, further including a core, wherein the memory controller receives the predicate instruction and the one or more conditional instructions from the core.

In some aspects, the techniques described herein relate to a system, wherein the core issues the one or more conditional instructions without waiting for the processing-in-memory component to process the predicate instruction.

In some aspects, the techniques described herein relate to a system, wherein the predicate register is located between the core and the processing-in-memory component.

In some aspects, the techniques described herein relate to an apparatus including: a predicate register, a processing-in-memory component, a core to issue instructions for the processing-in-memory component, the instructions including at least a predicate instruction, a first conditional instruction, and a second conditional instruction, and a memory controller to: receive the instructions and provide the predicate instruction to the processing-in-memory component, the predicate instruction including a request to compute a conditional value, receive, from the processing-in-memory component, a response that includes the conditional value computed by the processing-in-memory component, store the conditional value in the predicate register, and provide, to the processing-in-memory component, one of the first conditional instruction or the second conditional instruction based on the conditional value stored in the predicate register.

In some aspects, the techniques described herein relate to an apparatus, wherein the memory controller provides the first conditional instruction to the processing-in-memory component based on the conditional value stored in the predicate register.

In some aspects, the techniques described herein relate to an apparatus, wherein the memory controller prevents the second conditional instruction from being provided to the processing-in-memory component based on the conditional value stored in the predicate register.

In some aspects, the techniques described herein relate to an apparatus, wherein the core issues the first conditional instruction and the second conditional instruction without waiting for the processing-in-memory component to process the predicate instruction.

In some aspects, the techniques described herein relate to an apparatus, wherein the memory controller provides the second conditional instruction to the processing-in-memory component based on the conditional value stored in the predicate register and prevents the first conditional instruction from being provided to the processing-in-memory component based on the conditional value stored in the predicate register.

FIG. 1 is a block diagram of a non-limiting example system 100 having a host with a core, a memory module with a processing-in-memory component, and predicate registers between the core and the memory module. In particular, the system 100 includes host 102 and memory module 104. In this example, the host 102 includes a core 106 and a memory controller 108, and the memory controller 108 includes one or more predicate registers 110. The memory module 104 includes memory 112 and processing-in-memory component 114.

In accordance with the described techniques, the host 102 and the memory module 104 are coupled to one another via a wired or wireless connection. The core 106 and the memory controller 108 are also coupled to one another via one or more wired or wireless connections. Example wired connections include, but are not limited to, buses (e.g., a data bus), interconnects, traces, and planes. Examples of an apparatus or device in which the system 100 is implemented include, but are not limited to, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that performs various operations on and/or using data in the memory 112. Examples of the host 102 include, but are not limited to, a central processing unit (CPU), a graphics processing unit (GPU), a field programmable gate array (FPGA), an accelerated processing unit (APU), and a digital signal processor (DSP). The core 106 is a processing unit that reads and executes instructions (e.g., of a program), examples of which include to add, to move data, and to branch. Although one core 106 is depicted in the illustrated example, in variations, the host 102 includes more than one core 106, e.g., the host 102 is a multi-core processor.

In one or more implementations, the memory module 104 is a circuit board (e.g., a printed circuit board), on which the memory 112 is mounted and includes the processing-in-memory component 114. In variations, one or more integrated circuits of the memory 112 are mounted on the circuit board of the memory module 104, and the memory module 104 includes one or more processing-in-memory components 114. Examples of the memory module 104 include, but are not limited to, a TransFlash memory module, single in-line memory module (SIMM), and dual in-line memory module (DIMM). In one or more implementations, the memory module 104 is a single integrated circuit device that incorporates the memory 112 and the processing-in-memory component 114 on a single chip. In one or more implementations, the memory module 104 is composed of multiple chips that implement the memory 112 and the processing-in-memory component 114 that are vertically ("3D") stacked together, are placed side-by-side on an interposer or substrate, or are assembled via a combination of vertical stacking or side-by-side placement.

The memory 112 is a device or system that is used to store information, such as for immediate use in a device, e.g., by the core 106 of the host 102 and/or by the processing-in-memory component 114. In one or more implementations, the memory 112 corresponds to semiconductor memory where data is stored within memory cells on one or more integrated circuits. In at least one example, the memory 112 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 112 corresponds to or includes non-volatile memory, examples of which include flash memory, read-only memory (ROM), programmable read-only memory (PROM), erasable programmable read-only memory (EPROM), and electronically erasable programmable read-only memory (EEPROM). The memory 112 is configurable in a variety of ways that support predicates for processing-in-memory without departing from the spirit or scope of the described techniques.

The memory controller 108 is a digital circuit that manages the flow of data to and from the memory 112. By way of example, the memory controller 108 includes logic to read and write to the memory 112 and interface with the processing-in-memory component 114, e.g., to provide instructions to the processing-in-memory component 114 for processing by the processing-in-memory component 114. The memory controller 108 also interfaces with the core 106. For instance, the memory controller 108 receives instructions from the core 106 which involve accessing the memory 112 and provides data to the core 106, e.g., for processing by the core 106. In one or more implementations, the memory controller 108 is communicatively located between the core 106 and the memory module 104, and the memory controller 108 interfaces with both the core 106 and the memory module 104.

Broadly, the processing-in-memory component 114 includes one or more in-memory processors and is configured to process processing-in-memory instructions, e.g., received from the core 106 via the memory controller 108. For example, the one or more in-memory processors of the processing-in-memory component 114 processes the instructions using data stored in the memory 112. Processing-in-memory using in-memory processors contrasts with standard computer architectures which obtain data from memory, communicate the data to a remote processing unit (e.g., the core 106 of the host 102 which is remote from the memory module 104), and process the data using the remote processing unit (e.g., using the core 106 rather than the processing-in-memory component 114). In various scenarios, the data produced by the remote processing unit as a result of processing the obtained data is written back to memory, which involves communicating the produced data over the pathway from the remote unit to memory. In terms of data communication pathways, the remote processing unit (e.g., the core 106) is further away from the memory 112 than the processing-in-memory component 114. As a result, these standard computer architectures suffer from increased data transfer latency, reduced data communication bandwidth, and increased data communication energy, particularly when the volume of data transferred between the memory and the remote processing unit is large, which can also decrease overall computer performance. Thus, the processing-in-memory component 114 enables increased computer performance while reducing data transfer energy as compared to standard computer architectures that implement remote processing hardware. Further, the processing-in-memory component 114 alleviates memory performance and energy bottlenecks by moving one or more memory-intensive computations closer to the memory 112.

In accordance with the described techniques, the memory controller 108 provides one or more predicate instructions to the processing-in-memory component 114. The predicate instructions instruct the processing-in-memory component 114 to compute a predicate. In at least one example, a "predicate" refers to a condition expression (e.g., value at Memory Location A is greater than defined threshold). The processing-in-memory component 114 generates a conditional value responsive to computing the predicate. Examples of conditional values include, but are not limited to, Boolean values, such as true (or '1') and false (or '0'). In variations, the processing-in-memory component 114 computes different types of conditional values without departing from the spirit or scope of the described techniques.

The memory controller 108 is also configured to receive information from the memory module 104. After the processing-in-memory component 114 produces conditional values by computing predicates, for example, the memory controller 108 receives the conditional values from the processing-in-memory component 114. Although the memory controller 108 is depicted as integrated with the host 102, in one or more implementations, the memory controller 108 is a separate component from the host 102 (e.g., external to the host 102) that is communicatively coupled between the host 102 and the memory 112.

In accordance with the described techniques, the memory controller 108 includes or otherwise has access to the predicate registers 110. In the illustrated example, for instance, the predicate registers 110 are depicted as being located at the memory controller 108. However, in at least one variation (not shown), the predicate registers 110 are not included in the memory controller 108 but are nevertheless communicatively located between the core 106 and the processing-in-memory component 114. Thus, regardless of whether the predicate registers 110 are included in the memory controller 108, the predicate registers 110 are "closer" to the processing-in-memory component 114 than the core 106. Due to this, communication of data (e.g., predicates) between the processing-in-memory component 114 and the predicate registers 110 is faster and consumes fewer computing resources (e.g., power and bandwidth of connections from the memory controller 108 to the core 106) than communication of such data between the processing-in-memory component 114 and the core 106. The path of communication between the processing-in-memory component 114 and the predicate registers 110 is shorter than the path between the processing-in-memory component 114 and the core 106.

Likewise, the core 106 is closer to the memory controller 108 and the predicate registers 110 than the core 106 is to the processing-in-memory component 114. Accordingly, communication of data (e.g., instructions) between the core 106 and the memory controller 108 is faster and consumes fewer resources (e.g., power and bandwidth of connections from the memory controller 108 to the processing-in-memory component 114) than communication of such data between the core 106 and the processing-in-memory component 114. The path of communication between the core 106 and the memory controller 108 is shorter than the path between the core 106 and the processing-in-memory component 114.

In accordance with the described techniques, the predicate registers 110 store conditional values, e.g., generated by the processing-in-memory component 114 by processing predicate instructions. As noted above, in at least one example, conditional values indicate whether the respective predicates evaluate to true or false based on the data in the memory 112 that is used by the processing-in-memory component 114 to compute the predicate. In such examples, therefore, the conditional values stored in the predicate registers indicate whether the respective predicates evaluate to true (or 1) or false (or 0).

Consider an example where the processing-in-memory component 114 is instructed to compute the predicate "value at Memory Location A is greater than defined threshold," the 'value at Memory Location A' is equal to the integer 51, and the 'defined threshold' is equal to the integer 50. In this example, the processing-in-memory component 114 uses the data from the memory (e.g., the value at Location A of Memory) to compute that the predicate is true, and the processing-in-memory component 114 outputs a conditional value that corresponds to true (or 1). Once the processing-in-memory component 114 computes a predicate, the processing-in-memory component 114 sends a response to the memory controller 108 that includes the conditional value. In the continuing example, the conditional value sent to the memory controller 108 indicates that the predicate is true (or 1). The memory controller 108 stores the conditional value computed by the processing-in-memory component 114 in one of the predicate registers 110.

The memory controller 108 uses the conditional values stored in the predicate registers 110 to filter conditional instructions for communication to and processing by the processing-in-memory component 114. For example, the memory controller 108 is configured to issue conditional instructions to the processing-in-memory component 114 for processing based on the conditional values stored in the predicate registers 110, such as where conditional instructions are dependent on a predicate being true and a respective conditional value in the predicate registers 110 indicates that the predicate as computed by the processing-in-memory component 114 evaluates to true. The memory controller 108 is also configured to squash (e.g., nullify) other conditional instructions based on the conditional values stored in the predicate registers 110, such that those other conditional instructions are not communicated to the processing-in-memory component 114. By preventing communication of those instructions, the use of the predicate registers 110 avoids using memory-command bandwidth for communicating instructions that are not executed based computation of a predicate. In the context of using the predicate registers 110 to reduce latency for data-dependent, processing-in-memory predicates and to reduce use of memory command bandwidth in connection with conditional instructions, consider the following discussion of FIG. 2.

Figure 2:
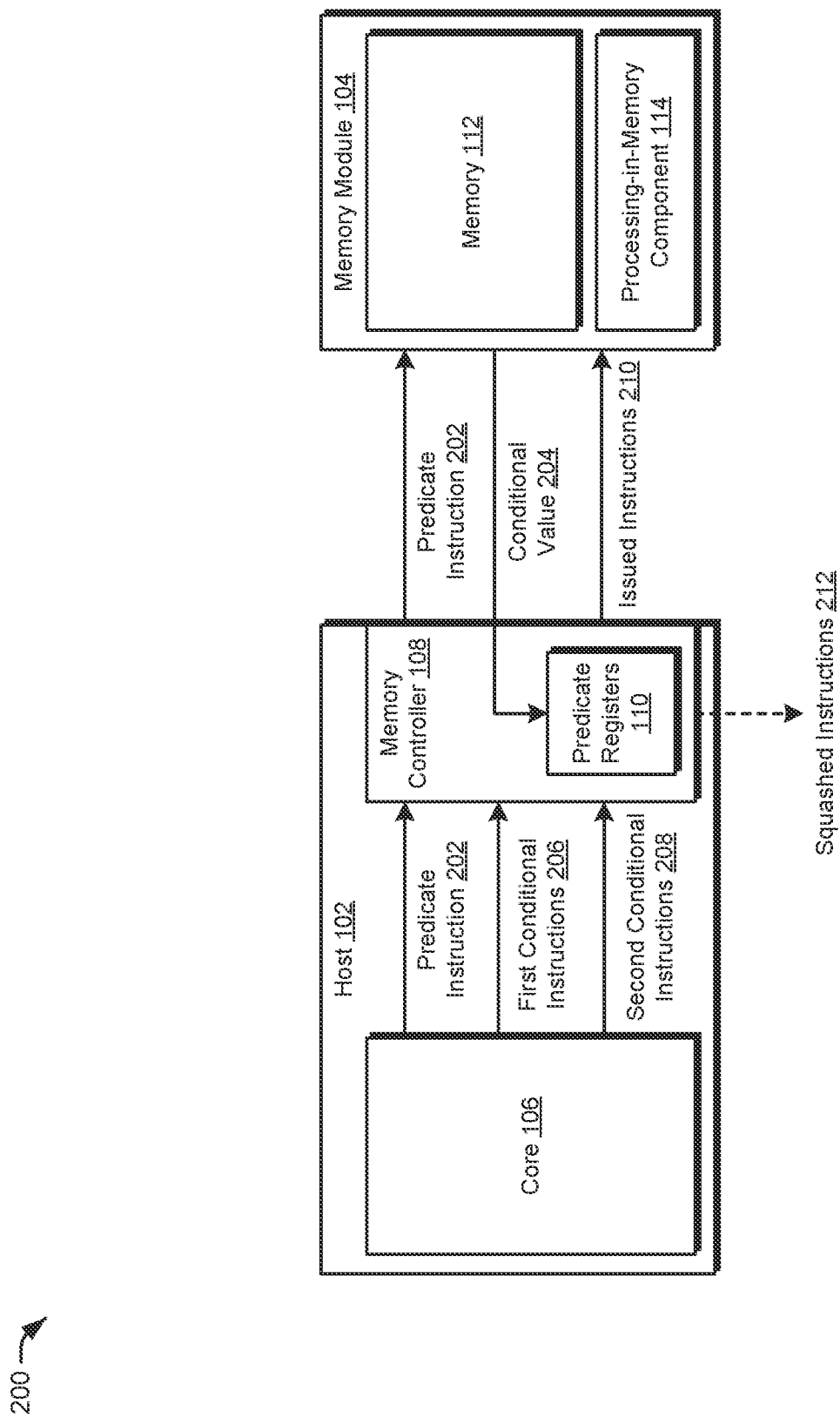
FIG. 2 depicts a non-limiting example of using predicate registers for conditional processing-in-memory instructions.

FIG. 2 depicts a non-limiting example 200 of using predicate registers for conditional processing-in-memory instructions.

The illustrated example 200 includes the host 102 having the core 106 and the memory controller 108, and the memory controller 108 includes the one or more predicate registers 110. The illustrated example 200 also includes the memory module 104 having the memory 112 and the processing-in-memory component 114. Additionally, the example 200 depicts communications of various data between the various components.

In accordance with the described techniques, the illustrated example 200 includes predicate instruction 202, conditional value 204, first conditional instructions 206, second conditional instructions 208, issued instructions 210, and squashed instructions 212. It is to be appreciated that in variations, additional and/or different communications are sent and received between the various components without departing from the spirit or scope of the described techniques. Where there are more than two possible paths for a branch, for example, the core 106 is capable of communicating more than just the first conditional instructions 206 and the second conditional instructions 208 to the memory controller 108. In a scenario where there are ten different paths for a branch, the core 106 can communicate ten different sets of conditional instructions to the memory controller 108 for filtering, e.g., to issue one or more sets of the instructions to the processing-in-memory component 114 and to squash others.

To demonstrate the described techniques, the predicate instruction 202, the conditional value 204, the first conditional instructions 206, the second conditional instructions 208, the issued instructions 210, and the squashed instructions 212 are discussed with reference to the following example pseudocode:

```
if(predicate_1) {
    conditional_instruction_A( );
    conditional_instruction_B( );
}
else {
    conditional_instruction_C( );
    conditional_instruction_D( );
}
```

Notably, this is merely one example of pseudocode and, in operation, the described techniques are implementable in connection with various processing-in-memory instructions that are executable to perform numerous different computations. For the following discussion, though, consider an example in which the predicate instruction 202 includes a predicate 'predicate_1', the first conditional instructions 206 correspond to a set of instructions that includes 'conditional_instruction_A( )' and 'conditional_instruction_B( )', and the second conditional instructions 208 correspond to a set of instructions that includes 'conditional_instruction_C( )' and 'conditional_instruction_D( )'. Consider also that 'predicate_1' corresponds to the example predicate "value at Memory Location A is greater than defined threshold" in the following discussion.

Given the if-then-else construction, the example pseudocode defines that in scenarios where the conditional value computed for 'predicate_1' corresponds to true (or 1), the "then" path of the pseudocode is to be executed, which includes the 'conditional_instruction_A( )' and 'conditional_instruction_B( )', e.g., the first conditional instructions 206. Thus, if the processing-in-memory component 114 processes the example predicate, "value at Memory Location A is greater than defined threshold", and, based on the data in the memory 112, computes a conditional value that corresponds to true (or 1), the pseudocode specifies that the first conditional instructions 206 are to be executed. In scenarios where the conditional value computed for 'predicate_1' does not correspond to true (or 1), e.g., it corresponds to false (or 0), the pseudocode specifies that its "else" path is to be executed, which includes the 'conditional_instruction_C( )' and 'conditional_instruction_D( )', e.g., the second conditional instructions 208. Thus, if the processing-in-memory component 114 processes the example predicate, "value at Memory Location A is greater than defined threshold", and, based on the data in the memory 112, computes a conditional value that corresponds to false (or 0), the pseudocode specifies that the second conditional instructions 208 are to be executed.

In accordance with the described techniques the core 106 communicates the predicate instruction 202 to the memory controller 108. The predicate instruction 202 includes at least one predicate (e.g., 'predicate_1') for computation by the processing-in-memory component 114. In one or more implementations, the predicate instruction 202 specifies, or is otherwise associated with, a predicate register 110 in which to store a response from the processing-in-memory component 114 to the predicate instruction 202. For example, the predicate instruction 202 specifies which of the predicate registers 110 is assigned to store the conditional value 204 computed by the processing-in-memory component 114 based on computation of the predicate included in the predicate instruction 202.

The memory controller 108 receives the predicate instruction 202 from the core 106, and communicates the predicate instruction 202 to the processing-in-memory component 114 for processing by the processing-in-memory component 114. Oftentimes, communication of a predicate instruction 202 involves less data than communication of a set of conditional instructions, which can include a large number of instructions relative to communication of the predicate instruction 202. As noted above, the predicate instruction 202 includes a predicate, which corresponds to one or more operations processed (e.g., evaluated) by the processing-in-memory component 114 using data in the memory 112. Although the example predicate above includes a single comparison involving data from the memory 112, e.g., a comparison of whether the "value at Memory Location A is greater than defined threshold," the described techniques are also operable in connection with predicates that include more than one comparison or other computations, e.g., whether "value at Memory Location A is greater than defined threshold && three times the value at Memory Location B is less than additional defined threshold".

The processing-in-memory component 114 reads data from the memory 112 and, using that data, computes the predicate (e.g., 'predicate_1') included in the predicate instruction 202. Typically, the data read from the memory 112 for computing a predicate is smaller than an amount of data which corresponds to a set of conditional instructions. The processing-in-memory component 114 outputs the conditional value 204 responsive to computing the predicate included in the predicate instruction 202. As noted above, examples of conditional values include Boolean values, such as 'true' or 'false' or '1' or '0'. Accordingly, the conditional values are configured as single-bit values in one or more implementations, e.g., '0' or '1'. In variations, however, the processing-in-memory component 114 outputs different conditional values responsive to computing predicates using data read from the memory 112.

The processing-in-memory component 114 sends the conditional value 204 to the memory controller 108. By way of example, the processing-in-memory component 114 returns the conditional value 204 to the memory controller 108 via a memory data return bus. In at least one variation, the memory interface between the host 102 and the memory module 104 is augmented to add one or more dedicated return connections (e.g., wires) over which the processing-in-memory component 114 returns the conditional value 204 to the memory controller 108.

The memory controller 108 receives the conditional value 204 and stores the conditional value 204 in the predicate registers 110. For example, the memory controller 108 stores the conditional value 204 in the predicate register 110 specified by the core 106 in the predicate instruction 202. The memory controller 108 then uses the conditional value 204 from the predicate registers 110 to filter instructions that are conditional upon the predicate in the predicate instruction 202 and the data in the memory 112.

In one example, for instance, the memory controller 108 sends the first conditional instructions 206 as the issued instructions 210 to the processing-in-memory component 114 based on the conditional value 204 maintained in the predicate registers 110. With reference to the pseudocode example above, for instance, when the processing-in-memory component 114 evaluates 'predicate_1' to 'true'— when it is true that value at Memory Location A is greater than defined threshold the memory controller 108 sends the conditional instructions corresponding to the 'then' path to the processing-in-memory component 114 as the issued instructions 210. In the continuing example, the conditional instructions corresponding to the 'then' path include the 'conditional_instruction_A( )' and 'conditional_instruction_B( )', e.g., the first conditional instructions 206. In this scenario, the memory controller 108 squashes or otherwise nullifies the conditional instructions corresponding to the 'else' path, which include 'conditional_instruction_C( )' and 'conditional_instruction_D( )', e.g., the second conditional instructions 208. Thus the second conditional instructions 208 correspond to the squashed instructions 212 in this particular example.

In a different example, the memory controller 108 sends the second conditional instructions 208 as the issued instructions 210 to the processing-in-memory component 114 based on the conditional value 204 maintained in the predicate registers 110. With reference again to the pseudocode example above, when the processing-in-memory component 114 evaluates 'predicate_1' to 'false'—when it is false that value at Memory Location A is greater than defined threshold—the memory controller 108 sends the conditional instructions corresponding to the 'else path to the processing-in-memory component 114 as the issued instructions 210. In the continuing example, the conditional instructions corresponding to the 'else path include the 'conditional_instruction_C( )' and 'conditional_instruction_D( )', e.g., the second conditional instructions 208. In this scenario, the memory controller 108 squashes or otherwise nullifies the conditional instructions corresponding to the 'then' path, which include 'conditional_instruction_A( )' and 'conditional_instruction_B( )', e.g., the first conditional instructions 206. Thus the first conditional instructions 206 correspond to the squashed instructions 212 in this different example.

By filtering conditional instructions at the memory controller 108 using conditional values 204 stored in the predicate registers 110, the described techniques prevent conditional instructions that are not executed based on data in the memory 112 from being sent over memory interfaces to the memory module 104. This avoids wasting memory command bandwidth so that it is usable for other operations and is advantageous in scenarios where processing-in-memory instructions include numerous conditions and numerous respective sets of conditional instructions. The described techniques thus limit the conditional instructions that are issued to the processing-in-memory component 114 to those that are ultimately executed by the processing-in-memory component 114. The described techniques also move processing of predicates from the core 106 to the processing-in-memory component 114, which is communicatively (and often physically) closer to the data in the memory 112 on which the predicates are evaluated.

In one or more implementations, the described techniques enable the core 106 to issue the first conditional instructions 206 and the second conditional instructions 208 without waiting for the processing-in-memory component 114 to process the predicate instruction 202, e.g., compute its predicate and return the conditional value 204. Rather, the core 106 is able to issue the first conditional instructions 206 and the second conditional instructions 208 to the memory controller 108, such that those instructions proceed to the memory controller 108 in a pipelined manner. The memory controller 108 delays sending the issued instructions 210 to the processing-in-memory component 114 though, until the predicate instruction 202 is processed. In variations, the memory controller 108 maintains ordering of the predicate instruction 202, the first conditional instructions 206, and the second conditional instructions 208 using techniques for ordering memory commands with dependencies. By way of example, the system maintains the processing-in-memory instructions issued from the core 106 to the memory controller 108 in sequential (e.g., first in first out) order.

As mentioned above, in one or more implementations, the core 106 identifies a predicate register 110 to use for the predicate instruction 202, e.g., to store the conditional value 204. In at least one such implementations, the core 106 is further configured to store a conditional value in a previously used predicate register 110 responsive to determining that the conditional value stored in the previously used predicate register is no longer being used to filter conditional instructions. Alternatively or additionally, the core 106 associates a same indicator with the predicate instruction 202, the conditional value 204, and subsequent first conditional instructions 206 and second conditional instructions 208 to indicate that they all refer to the same predicate. One example of a same indicator is a tag with the same value. In such implementations, the memory controller 108 is uses dynamic resource allocation techniques to assign predicate registers 110 to distinct indicators sent from the core 106. In one or more implementations, the core 106 limits a number of in-flight memory control predicate indicators used at a point in time to limit resource contention for the predicate registers 110 at the memory controller 108 (and resulting potential deadlock and starvation).

In variations, the predicate registers 110 are used for speculative memory operations. By way of example, the core 106 tags speculative memory operations issued under a predicated branch outcome with a controller predicate. Responsive to resolving the branch outcome, the memory controller predicate is updated via a high-priority network packet or a fast path (e.g., bypassing caches) to the memory controller 108. Based on the information in the predicate registers 110, the memory controller 108 permits the speculative memory operations or squashes (e.g., nullifies) them. Alternatively or in addition, the predicate registers 110 and filtering by the memory controller 108 are used in connection with prefetch operations where the predicate is populated via a fast path as prefetch confidence improves.

Figure 3:
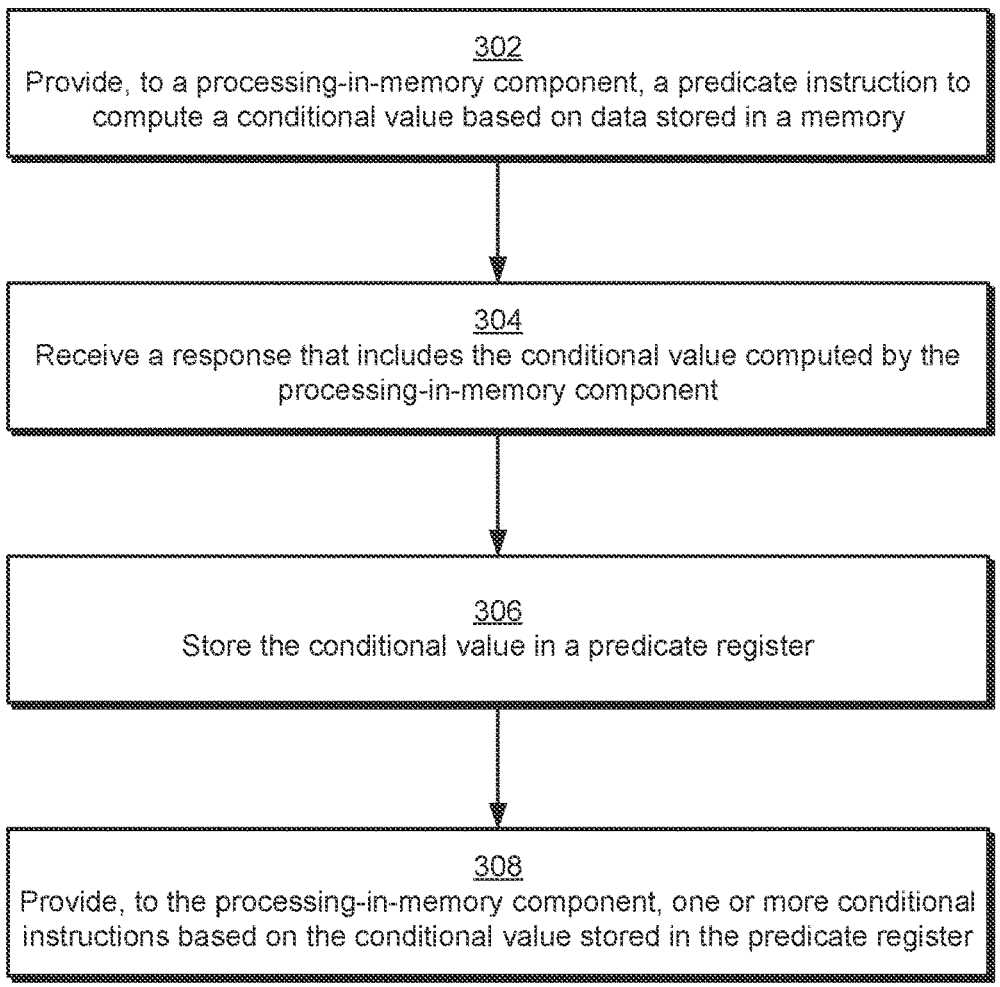
FIG. 3 depicts a procedure in an example implementation of using predicate registers for conditional processing-in-memory instructions.

FIG. 3 depicts a procedure 300 in an example implementation of using predicate registers for conditional processing-in-memory instructions.

A predicate instruction to compute a conditional value based on data stored in a memory is provided to a processing-in-memory component (block 302). By way of example, the memory controller 108 provides one or more predicate instructions 202 to the processing-in-memory component 114. The predicate instructions 202 instruct the processing-in-memory component 114 to compute a conditional value 204 based on data stored in a memory 112.

A response that includes the conditional value computed by the processing-in-memory component is received (block 304). By way of example, the processing-in-memory component 114 reads data from the memory 112 and, using that data, computes the predicate included in the predicate instruction 202. Typically, the data read from the memory 112 for computing a predicate is smaller than an amount of data which corresponds to a set of conditional instructions. The processing-in-memory component 114 outputs the conditional value 204 responsive to computing the predicate included in the predicate instruction 202, and the memory controller receives, from the processing-in-memory component 114, a response that includes the conditional value 204 computed by the processing-in-memory component 114.

The conditional value is stored in a predicate register (block 306). By way of example, the memory controller 108 receives the conditional value 204 and stores the conditional value 204 in the predicate registers 110. For example, the memory controller 108 stores the conditional value 204 in the predicate register 110 specified by the core 106 in the predicate instruction 202.

One or more conditional instructions are provided to the processing-in-memory component based on the conditional value stored in the predicate register (block 308). By way of example, the memory controller uses the conditional value 204 from the predicate registers 110 to filter instructions that are conditional upon the conditional value 204 stored in the predicate register 110.

Figure 4:
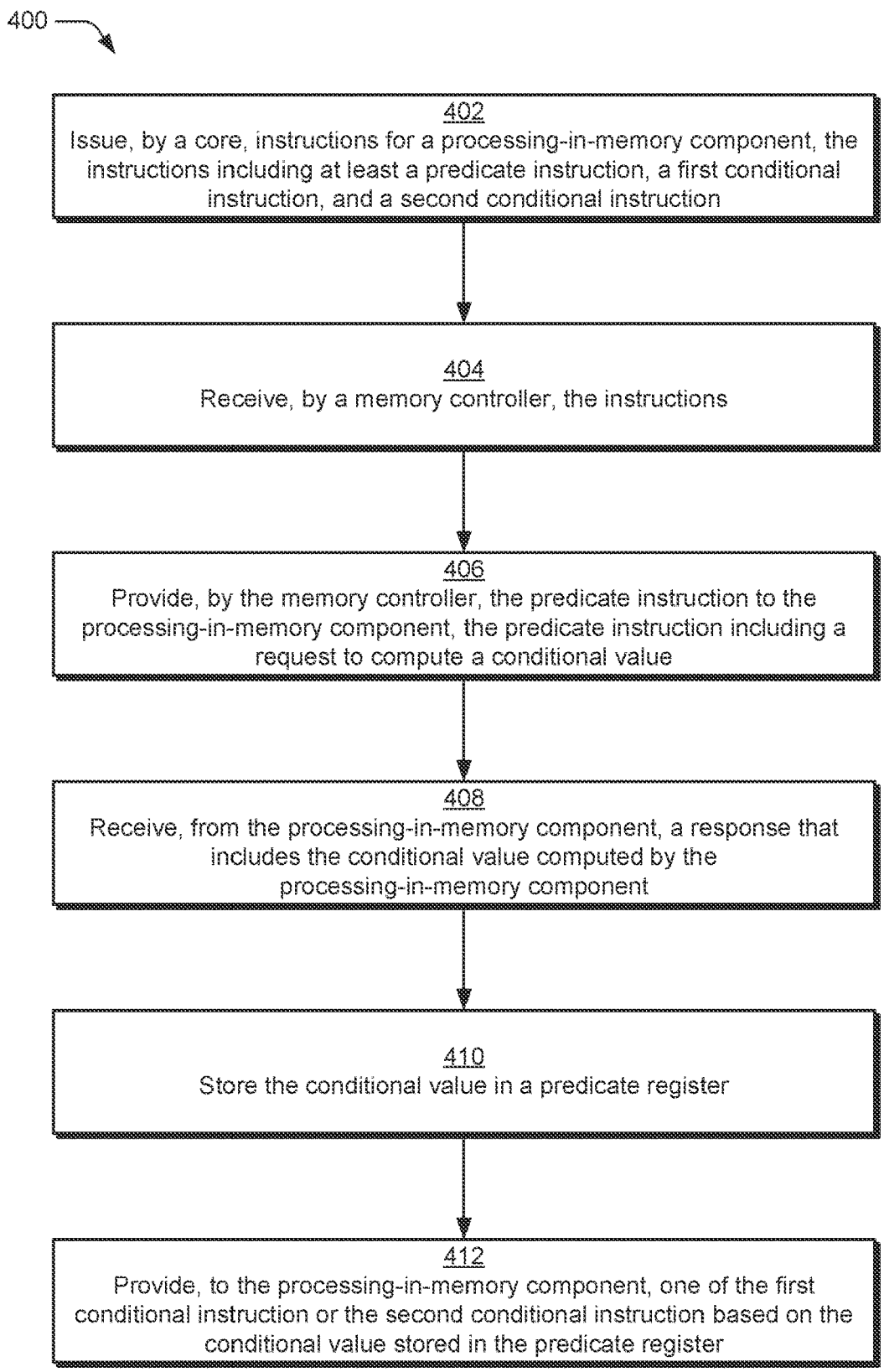
FIG. 4 depicts a procedure in an additional example implementation of using predicate registers for conditional processing-in-memory instructions.

FIG. 4 depicts a procedure 400 in an additional example implementation of using predicate registers for conditional processing-in-memory instructions.

Instructions for a processing-in-memory component are issued by a core (block 402). In accordance with the principles discussed herein, the instructions include at least a predicate instruction, a first conditional instruction, and a second conditional instruction. By way of example, the core 106 issues instructions which include at least a predicate instruction 202, a first conditional instruction 206, and a second conditional instruction 208. The predicate instruction 202 includes at least one predicate for computation by the processing-in-memory component 114. In one or more implementations, the core 106 issues the first conditional instructions 206 and the second conditional instructions 208 without waiting for the processing-in-memory component 114 to process the predicate instruction 202, e.g., compute its predicate and return the conditional value 204. Rather, the core 106 is able to issue the first conditional instructions 206 and the second conditional instructions 208 to the memory controller 108, such that those instructions proceed to the memory controller 108 in a pipelined manner. Alternately, the core 106 waits until the conditional value 204 is computed by the processing-in-memory component 114 before issuing the first and second conditional instructions.

The instructions are received by a memory controller (block 404). By way of example, the memory controller 108 receives the instructions issued by the core 106, which includes the predicate instruction 202, the first conditional instruction 206, and the second conditional instruction 208.

The predicate instruction is provided by the memory controller to the processing-in-memory component (block 406). In accordance with the principles discussed herein, the predicate instruction includes a request to compute a conditional value. By way of example, the memory controller 108 receives the predicate instruction 202 from the core 106, and communicates the predicate instruction 202 to the processing-in-memory component 114 for processing by the processing-in-memory component 114. Oftentimes, communication of a predicate instruction 202 involves less data than communication of a set of conditional instructions which can include a large number of instructions relative to communication of the predicate instruction 202. Thus, rather than providing the first conditional instruction 206 and the second conditional instruction 208 to the processing-in-memory component 114, the memory controller 108 only provides the predicate instruction 202.

A response that includes the conditional value computed by the processing-in-memory component is received from the processing-in-memory component (block 408). By way of example, the processing-in-memory component 114 reads data from the memory 112 and, using that data, computes the predicate included in the predicate instruction 202. The processing-in-memory component 114 outputs the conditional value 204 responsive to computing the predicate included in the predicate instruction 202, and sends a response that includes the conditional value 204 to the memory controller 108. By way of example, the processing-in-memory component 114 returns the conditional value 204 to the memory controller 108 via a memory data return bus. In at least one variation, the memory interface between the host 102 and the memory module 104 is augmented to add one or more dedicated return connections (e.g., wires) over which the processing-in-memory component 114 returns the conditional value 204 to the memory controller 108.

The conditional value is stored in a predicate register (block 410). By way of example, the memory controller 108 receives the conditional value 204 and stores the conditional value 204 in the predicate registers 110. For example, the memory controller 108 stores the conditional value 204 in the predicate register 110 specified by the core 106 in the predicate instruction 202.

One of the first conditional instruction or the second conditional instruction is provided to the processing-in-memory component based on the conditional value stored in the predicate register (block 412). By way of example, the memory controller 108 uses the conditional value 204 from the predicate registers 110 to filter the first and second conditional instructions that are conditional upon the predicate in the predicate instruction 202 and the data in the memory 112. In one example, for instance, the memory controller 108 sends the first conditional instructions 206 as the issued instructions 210 to the processing-in-memory component 114 based on the conditional value 204 maintained in the predicate registers 110. In this scenario, the memory controller 108 squashes or otherwise nullifies the second conditional instructions 208. In a different example, the memory controller 108 sends the second conditional instructions 208 as the issued instructions 210 to the processing-in-memory component 114 based on the conditional value 204 maintained in the predicate registers 110. In this scenario, the memory controller 108 squashes or otherwise nullifies the first conditional instructions 206.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102 having the core 106 and the memory controller 108 with the predicate registers 110 as well as the memory module 104 having the memory 112 and the processing-in-memory component 114) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
   providing, to a processing-in-memory component, a predicate instruction to compute a conditional value based on data stored in a memory;
   receiving, from the processing-in-memory component, a response at a memory controller remote from the processing-in-memory component and the memory, the response including the conditional value computed by the processing-in-memory component;

storing the conditional value in a predicate register of the memory controller, the predicate register specified by the predicate instruction; and providing, to the processing-in-memory component, one or more conditional instructions based on the conditional value stored in the predicate register.

2. The method of claim 1, wherein the providing the one or more conditional instructions based on the conditional value stored in the predicate register further comprises:

providing, to the processing-in-memory component, a first conditional instruction of the one or more conditional instructions if the conditional value corresponds to a first value; or providing, to the processing-in-memory component, a second conditional instruction of the one or more conditional instructions if the conditional value corresponds to a second value.

3. The method of claim 1, further comprising preventing at least one of the one or more conditional instructions from being provided to the processing-in-memory component based on the conditional value stored in the predicate register.

4. The method of claim 1, wherein each of the providing the predicate instruction to the processing-in-memory component and the providing the one or more conditional instructions to the processing-in-memory component is performed by the memory controller remote from the processing-in-memory component.

5. The method of claim 4, wherein the memory controller receives the predicate instruction and then separately receives the one or more conditional instructions from a core.

6. The method of claim 5, wherein the core issues the one or more conditional instructions without waiting for the processing-in-memory component to process the predicate instruction.

7. The method of claim 5, wherein the predicate register is located between the core and the processing-in-memory component.

8. The method of claim 1, wherein the response that includes the conditional value is received from the processing-in-memory component at the memory controller remote from the processing-in-memory component via a dedicated return connection.

9. The method of claim 1, wherein the conditional value comprises a Boolean value.

10. A system comprising:

a predicate register of a memory controller, the predicate register configured to store conditional values computed by a processing-in-memory component; and the memory controller configured to:

provide, to the processing-in-memory component, a predicate instruction to compute a conditional value based on data stored in a memory;

receive, from the processing-in-memory component, a response that includes the conditional value computed by the processing-in-memory component;

store the conditional value in the predicate register, the predicate register specified by the predicate instruction; and provide, to the processing-in-memory component, one or more conditional instructions based on the conditional value stored in the predicate register.

11. The system of claim 10, further comprising a core, wherein the memory controller receives the predicate instruction and the one or more conditional instructions from the core.

12. The system of claim 11, wherein the core issues the one or more conditional instructions without waiting for the processing-in-memory component to process the predicate instruction.

13. The system of claim 11, wherein the predicate register is located between the core and the processing-in-memory component.

14. An apparatus comprising:

a processing-in-memory component;

a core to issue instructions for the processing-in-memory component, the instructions including at least a predicate instruction, a first conditional instruction, and a second conditional instruction; and a memory controller including a predicate register and configured to:

receive the instructions and provide the predicate instruction to the processing-in-memory component, the predicate instruction comprising a request to compute a conditional value;

receive, from the processing-in-memory component, a response that includes the conditional value computed by the processing-in-memory component;

store the conditional value in the predicate register, the predicate register specified by the predicate instruction; and provide, to the processing-in-memory component, one of the first conditional instruction or the second conditional instruction based on the conditional value stored in the predicate register.

15. The apparatus of claim 14, wherein the memory controller provides the first conditional instruction to the processing-in-memory component based on the conditional value stored in the predicate register.

16. The apparatus of claim 15, wherein the memory controller prevents the second conditional instruction from being provided to the processing-in-memory component based on the conditional value stored in the predicate register.

17. The apparatus of claim 14, wherein the core issues the first conditional instruction and the second conditional instruction without waiting for the processing-in-memory component to process the predicate instruction.

18. The apparatus of claim 14, wherein the memory controller provides the second conditional instruction to the processing-in-memory component based on the conditional value stored in the predicate register and prevents the first conditional instruction from being provided to the processing-in-memory component based on the conditional value stored in the predicate register.

19. The method of claim 1, wherein the memory controller receives the one or more conditional instructions from a core, and a path of communication between the core and the memory controller is shorter than a path of communication between the core and the processing-in-memory component.

20. The apparatus of claim 14, wherein the memory controller is communicatively located between the core and the processing-in-memory component, and the core is closer to the memory controller and the predicate register than the core is to the processing-in-memory component.

* * * * *